(12) United States Patent
Shetty et al.

(10) Patent No.: US 11,526,465 B2
(45) Date of Patent: Dec. 13, 2022

(54) GENERATING HASH TREES FOR DATABASE SCHEMAS

(71) Applicant: salesforce.com, inc., San Francisco, CA (US)

(72) Inventors: Aditya Shetty, San Francisco, CA (US); Thomas Fanghaenel, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 259 days.

(21) Appl. No.: 16/719,691

(22) Filed: Dec. 18, 2019

(65) Prior Publication Data

US 2021/0191903 A1 Jun. 24, 2021

(51) Int. Cl.
*G06F 16/00* (2019.01)
*G06F 16/11* (2019.01)
*G06F 16/901* (2019.01)

(52) U.S. Cl.
CPC ........ *G06F 16/128* (2019.01); *G06F 16/9027* (2019.01)

(58) Field of Classification Search
CPC .......................... G06F 16/128; G06F 16/9027
See application file for complete search history.

(56) References Cited

U.S. PATENT DOCUMENTS

| | | | |
|---|---|---|---|
| 8,655,919 B2 | 2/2014 | Cachin et al. | |
| 10,482,078 B2 | 11/2019 | Hakala et al. | |
| 10,977,275 B1* | 4/2021 | Bauer | G06F 16/273 |
| 2005/0114404 A1* | 5/2005 | Pintar | G06F 16/2474 |
| 2007/0156806 A1* | 7/2007 | Becker | G06Q 10/10 709/203 |
| 2007/0288495 A1 | 12/2007 | Narasayya et al. | |
| 2010/0114832 A1 | 5/2010 | Lillibridge et al. | |
| 2011/0307450 A1* | 12/2011 | Hahn | G06F 16/2282 707/769 |
| 2015/0248404 A1 | 9/2015 | Pazdziora et al. | |
| 2018/0129585 A1* | 5/2018 | Martin | G06F 16/21 |

(Continued)

OTHER PUBLICATIONS

Das, Sudipto, Divyakant Agrawal, and Amr El Abbadi. "Elastras: An elastic, scalable, and self-managing transactional database for the cloud." ACM Transactions on Database Systems (TODS) 38.1 (2013): 1-45.*

(Continued)

*Primary Examiner* — Nan Hutton
(74) *Attorney, Agent, or Firm* — Kowert, Hood, Munyon, Rankin & Goetzel, P.C.; Mark D. Seegers; Dean M. Munyon (57) ABSTRACT

Techniques are disclosed relating to determining whether a set of database schemas are different. A computer system may receive a request to create a snapshot for a set of data stored in a database having a first database schema. In response to receiving the request, the computer system may create the snapshot for the set of data. As part of the creating, the computer system may generate, based on the first database schema, a first hierarchy of hash values that includes a first root hash value for the first database schema. The first hierarchy of hash values may be usable to determine whether the first database schema is different from a second database schema. The computer system may include the first hierarchy of hash values with the snapshot.

20 Claims, 9 Drawing Sheets

(56) References Cited

U.S. PATENT DOCUMENTS

2019/0034285 A1* 1/2019 Knechtel .................. G06F 9/52
2020/0034459 A1* 1/2020 Rabe ...................... G06F 16/27

OTHER PUBLICATIONS

Aulbach, Stefan, et al. "Extensibility and data sharing in evolving multi-tenant databases." 2011 IEEE 27th international conference on data engineering. IEEE, 2011.*
International Search Report and Written Opinion in PCT Appl. No PCT/US2020/064848 dated Mar. 15, 2021, 10 pages.

* cited by examiner

GENERATING HASH TREES FOR DATABASE SCHEMAS

BACKGROUND

Technical Field

This disclosure relates generally to database schemas and, more specifically, to creating a hash tree (or hierarchy of hash values) having a root hash value that identifies a database schema.

Description of the Related Art

Modern database systems routinely implement management systems that enable users to store a collection of information in an organized manner that can be efficiently accessed and manipulated. In many cases, these management systems maintain relational databases that are structured to recognize the relations among pieces of information. The information stored in a relational database is usually organized as a set of tables each composed of columns and rows in which each column defines a grouping of information. In the relational database context, the structure of the tables (e.g., the columns that form a table) and how they relate are specified in a database schema that provides a logical grouping of the objects in a database such as tables, views, stored procedures, etc. A database schema can go through various changes throughout the life of a database as additional tables are added and older tables are structurally changed or removed.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the first and second processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Many database systems are capable of creating database snapshots of the databases that they manage. The term "database snapshot" is used herein in accordance with its ordinary and accustomed meaning in the art and refers to a database construct that saves the state of a portion or all of a database at the point in time at which the database snapshot is created. Accordingly, a database snapshot can be used to recreate the portion or all of the database corresponding to the state at which the database snapshot was created. But in some implementations, a database snapshot does not store certain information about a database such as its database schema. When recreating a portion or all of a database, a database system can use the database schema already in place. If, however, that database schema is different than the database schema in place at the point in time when the snapshot was created, then the database system will likely run into issues such as data corruption and system crashes.

As an example, in a multi-tenant model, a database system stores data in a database for multiple tenants. At some point, the database system may generate a tenant database snapshot that captures all the data of a particular tenant at that point in time. This database snapshot may be used, for example, to recreate the tenant in a sandbox environment or on a different database as part of a tenant-migration service. If the database schema of the sandbox environment or the other database is different (e.g., some table includes additional columns), then the tenant's data will not be able to be imported under that database schema without data corruption or another undesired issue. It may thus be desirable to determine if two database schemas are different in order to avoid those undesired issues.

The present disclosure describes various techniques for determining whether database schemas are different and identifying how different database schemas are different. In various embodiments described below, a database system creates a snapshot for a set of data stored in a database managed by the database system. In some cases, the database system may create a snapshot in response to receiving a request from another system, such as an application server or a user device. As part of creating the snapshot, in various embodiments, the database system applies hash functions to different portions of information specified in a database schema that defines a database hierarchy in which database objects (e.g., tables) include attributes/columns that themselves include properties (e.g., a data type). The term "hash function" is used herein in accordance with its ordinary and accustomed meaning in the art and refers to a function that can be used to map data of arbitrary size to fixed-size values. The database system, in various embodiments, hashes together (i.e., by applying a hash function) one or more properties of each attribute to derive a first level of a hierarchy of hash values. The term "hash value" is used herein in accordance with its ordinary and accustomed meaning in the art and refers to a value that is derived by applying a hash function to data. The database system can group hash values of the first level that are related to the same database table and apply a hash function to the individual groups to derive a second level of the hierarchy of hash values. This process may then continue (e.g., by hashing together the hash values of the second level) until a a root hash value is ultimately derived. This root hash value may thus be representative of the entire database schema in some embodiments. In various embodiments, the database system includes the hierarchy of hash values with the created snapshot.

When recreating the state identified by a snapshot (e.g., causing a database to store the set of data that was captured by the snapshot when it was created), in various embodiments, the database system generates a second hierarchy of hash values based on the current database schema of the database in which the data of the snapshot is being stored. The database system thereafter determines whether the database schema that is associated with the snapshot is different from the current database schema by comparing the root hash values of the two hierarchies. In the event that the two root hash values are different, the database system can prevent the data associated with the snapshot from being stored in the database as those two database schemas are different. In various embodiments, the database system compares the corresponding branches (or portions) of the two hierarchies to identify at least one branch that is different. The database system may return a response to a user that identifies the branch so that the user learns, with specificity, how the two database schemas are different.

These techniques advantageously allow a system to determine whether two database schemas are different. As a result, the system can prevent data from being imported under a different database schema, preventing an issue such as data corruption. For example, if a new database schema is missing a column for a particular table that is defined in another database schema, then data associated with that column will be lost when the system attempts to import that data from the other database schema to the new database schema. The techniques described in this disclosure can also be used to identify the differences between database schemas. This allows a user to know how to update a database schema so that data can be properly imported under that schema without corruption. An exemplary application of these techniques will now be discussed, starting with reference to FIG. 1.

Figure 1:
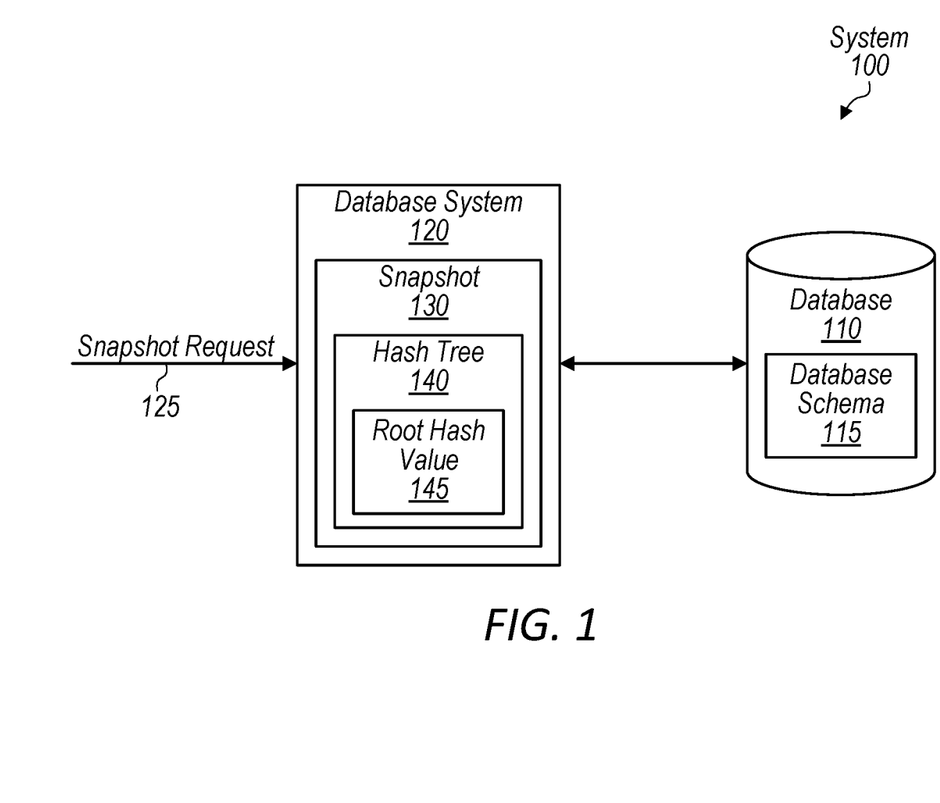
FIG. 1 is a block diagram illustrating example elements of a system capable creating a hash tree having a root hash value that is usable to identify a database schema, according to some embodiments.

Turning now to FIG. 1, a block diagram of a system 100 is shown. System 100 includes a set of components that may be implemented via hardware or a combination of hardware and software routines. In the illustrated embodiment, system 100 includes a database 110 having a database schema 115 and a database system 120 having a snapshot 130, which is a snapshot of database 110. As further illustrated, snapshot 130 includes a hash tree 140 having a root hash value 145. In some embodiments, system 100 may be implemented differently than illustrated. As an example, system 100 may include multiple database systems 120 that interact with database 110.

System 100, in various embodiments, implements a platform service that allows users of that service to develop, run, and manage applications. As an example, system 100 may be a multi-tenant system that provides various functionality to a plurality of users/tenants hosted by the multi-tenant system. Accordingly, system 100 may execute software routines from various, different users (e.g., providers and tenants of system 100) as well as provide code, web pages, and other data to users, databases (e.g., database 110), and other entities associated with system 100. As illustrated, system 100 includes database system 120 that interacts with database 110 to store and access data for users that are associated with system 100.

Database 110, in various embodiments, is a collection of information that is organized in a manner that allows for access, storage, and manipulation of that information. Accordingly, database 110 may include supporting software that allows for database system 120 to perform operations (e.g., accessing, storing, etc.) on information in database 110. Database 110 may be implemented by a single storage device or multiple storage devices that are connected together on a network (e.g., a storage attached network) and are configured to redundantly store information in order to prevent data loss. In some embodiments, database 110 is implemented using a log-structured merge-tree (LSM tree) having multiple levels. One or more of the levels may include database records that are cached in an in-memory buffer prior to being written to the levels that are maintained on an on-disk storage medium. These database records may correspond to rows in a database table that is defined by database schema 115.

Database schema 115, in various embodiments, is a collection of information defining how data is organized in database 110 and how subsets of that data are related. That is, database schema 115 may be a blueprint that provides a logical grouping of the objects within database 110, such as database tables, views, stored procedures, etc. As discussed in greater detail with respect to FIG. 2, in various embodiments, database schema 115 (or a set of database schemas 115) defines the database tables maintained for database 110, including the attributes that make up those database tables. For example, database schema 115 may define a "customer" database table having attributes (or columns) such as first name, last name, email address, etc. Each one of those attributes may be associated with a set of properties that is defined by database schema 115. For example, the "first name" attribute may be associated with a data type of "char."

In various embodiments, database schema 115 defines the relationships among objects (e.g., database tables) in database 110. As an example, database schema 115 may define, for a database table, a foreign key that links that database table to another database table by serving as a reference to a primary key of the other database table. Database schema 115 may further define, for a database table, a primary key that can be used to uniquely identify each record of that database table. Database schema 115, in some embodiments, defines additional metadata such as database triggers that are executed upon certain events occurring in relation to database objects defined by database schema 115. As discussed in more detail below, the various pieces of information (e.g., database tables, primary keys, etc.) defined in database schema 115 are used by database system 120 to generate hash tree 140.

Database system 120, in various embodiments, performs various operations to manage database 110, including data storage, data retrieval, and data manipulation. As such, database system 120 may provide database services to other systems that wish to interact with database 110. Such database services may include accessing and storing data maintained for a database table of database 110. As an example, an application server may issue a transaction request to database system 120 that includes a transaction specifying that a particular database record be written to database 110 for a particular database table. As illustrated, database system 120 can receive a snapshot request 125 to create a snapshot 130. Snapshot request 125 may be received from a user or another component of system 100 and may specify a particular tenant of system 100 for which snapshot 130 is to be created. In some instances, database system 120 may create snapshot 130 are periodic intervals of time or in response to certain events other than receiving snapshot request 125 (e.g., after writing a batch of records to database 110).

Snapshot 130, in various embodiments, is a database construct that saves the state of a portion or all of database 110 at a particular point in time (typically, when database snapshot 130 is created). In some embodiments, snapshot 130 may be a tenant snapshot that saves the state associated with a corresponding tenant with respect to database 110. For example, snapshot 130 may identify a portion or all of the data of a tenant that is stored within database 110 at a particular point in time, but not data associated with other tenants. Consequently, in various embodiments, snapshot 130 is usable to reconstruct the portion or all of the data of database 110 that existed when snapshot 130 was created.

Continuing with the pervious example, database system 120 may restore database 110 to a state where it stores the tenant's data that existed at the particular point in time when snapshot 130 was created. As a result of this capability, snapshot 130 can used to repair database 110 if data corruption has occurred. Snapshot 130 may also be used for testing purposes—e.g., to import a tenant's data into a database 110 associated with a test environment.

In various embodiments, however, snapshot 130 does not identify the state of database schema 115. That is, snapshot 130 does not identify the metadata defined by database schema 115. Accordingly, when using snapshot 130 to recreate a saved state, database system 120 may use the database schema 115 that is in place (i.e., is the current version) at the time when snapshot 130 is created. In some instances, snapshot 130 may be stored for an extended period of time. During that time, database schema 115 may be altered—e.g., a new attribute may be added to an existing database table. In other instances, snapshot 130 may be used to recreate a saved state for a database other than the one for which it was created. For example, as part of a tenant migration service, a tenant's data may be moved to a second database from a first database. Snapshot 130 may thus be created based on the first database. The second database 110, however, may have a different database schema 115 than the first database. Accordingly, in either instance, database system 120 may not be able to recreate the state saved by snapshot 130 if the database schema 115 being used is different than the one associated with snapshot 130.

Given these shortcomings, the present inventors have recognized the desirability not only of detecting whether two database schemas are different, but also the specific portions of the schemas that are different. To address this issue, the inventors have proposed associating a schema hash tree with a database schema 115. This schema hash tree includes a root hash value that uniquely identifies a particular database schema 115 and can be compared with other root hash values to determine whether those other root hash values identify the same particular database schema 115 or other database schemas 115. As depicted in FIG. 1, a hash tree 140 is included in a snapshot 130 of a database 110 so that when using snapshot 130 (e.g., to import a tenant's data into a database 110), a database system 120 can determine whether the current in place database schema 115 is different from the one for which snapshot 130 was created.

Hash tree 140, in various embodiments, is hierarchy of hash values that includes a root hash value 145 that corresponds to database schema 115. Hash tree 140 may be used to determine if and how its corresponding database schema 115 is different from another database schema 115 by comparing hash values of hash tree 140 and hash values of another hash tree 140 that corresponds to the other database schema 115. As an example, if the root hash values 145 of those two hash trees 140 are different values, then their corresponding database schemas 115 are different. If two hash trees 140 are different, in various embodiments, database system 120 traverses the branches of each hash tree 140 and compares the corresponding hash values between each hash tree 140. (An example of a difference between branches is discussed with respect to FIG. 3B). Based on differences in hash values, database system 120 may identify specific parts of the two database schemas 115 that are different. For example, database system 120 may identify that the second database schema 115 defines an additional attribute for a database table that is defined by both database schemas 115.

In various embodiments, database system 120 creates hash tree 140 by applying a hash function to portions of the metadata defined in database schema 115. In some embodiments, database system 120 hashes together the properties of each attribute to create an initial level of hash tree 140. If snapshot 130 is a tenant snapshot of a particular tenant of database 110, then database system 120 may hash the properties of only those tables that are associated with that particular tenant. Database system 120 may then apply a hash function to a group of hash values of the initial level where those hash values correspond to the same database table/object. As a result, a second level of hash tree 140 is created. Database system 120 may apply a hash function that receives all of the hash values of the second level as input in order to generate root hash value 145. After creating hash tree 140, in various embodiments, database system 120 includes the created hash tree 140 with snapshot 130. Accordingly, when using snapshot 130, database system 120 may use hash tree 140 to determine if the current database schema 115 is different from the database schema 115 associated with snapshot 130 as explained earlier. In this manner, database system 120 can prevent data corruption and other issues from occurring when using snapshot 130.

Figure 2:
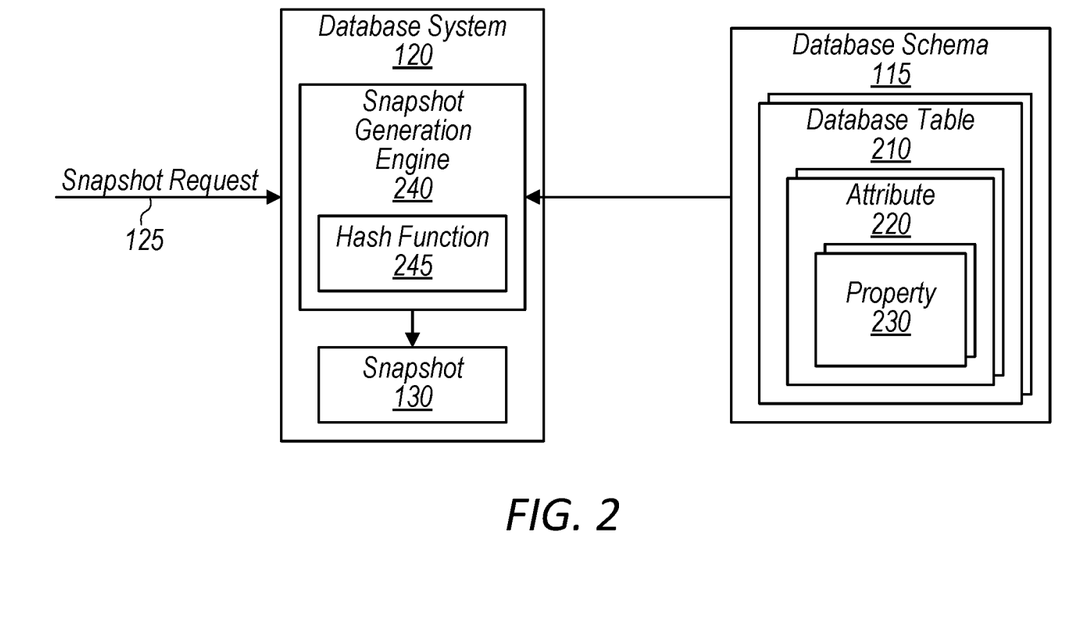
FIG. 2 is a block diagram illustrating example elements of a snapshot generation engine capable of generating snapshots that include a hash tree, according to some embodiments.

Turning now to FIG. 2, a block diagram of an example database schema 115 and an example database system 120 is shown. In the illustrated embodiment, database schema 115 includes database tables 210 having attributes 220 that include properties 230. Also as shown, database system 120 includes a snapshot generation engine 240 having a hash function 245. In some embodiments, database schema 115 and/or database system 120 may be implemented differently than shown. As an example, snapshot generation engine 240 may include multiple hash functions 245.

As explained previously, in various embodiments, database schema 115 is a collection of information that provides a structuring of data stored in database 110. As depicted, database schema 115 defines database tables 210, attributes 220, and properties 230. This information is usable, in various embodiments, to generate a hash tree 140 that uniquely identifies database schema 115.

Database schema 115 defines a set of database tables 210 that are used for organizing data of database 110. A database table 210, in various embodiments, is made up of columns and rows in which each column defines a field of information and each row provides a record that may include a value for that field. In various embodiments, a column of a database table 210 corresponds to an attribute 220 defined by database schema 115. For example, a "product" database table 210 may include a "price" attribute 220 that is a column of that product database table 210. The product database table 210 may include other attributes 220 such as a "product ID" attribute 220, a "product name" attribute 220, a "product quantity" attribute 220, etc. As such, a record of the product database table 210 may define a product ID value, a product name value, a price value, and a product quantity value.

As further shown, an attribute 220 is associated with a set of properties 230. A property 230, in various embodiments, identifies a characteristic of its corresponding attribute 220. For example, properties 230 may include the name of an attribute (e.g., "product name"), the data type of an attribute (e.g., char), the max length of the data type (e.g., 20 characters), whether a null value is accepted, whether the attribute is being used as a primary key, etc. Properties 230 may expressed in a text-based format that permits a hash function to be applied to a portion or all of the properties of a particular attribute 220.

Snapshot generation engine 240, in various embodiments, is a set of software routines executable to create a snapshot 130 that includes a hash tree 140. When creating hash tree 140, snapshot generation engine 240 may initially retrieve database schema 115 from database 110 or another storage area. To create hash tree 140, in various embodiments, snapshot generation engine 240 provides, for each attribute 220, one or more of the properties 230 of that attribute 220 to hash function 245 to derive a hash value. (Hash function 245, in various embodiments, is a non-cryptographic hash function that is suitable for generating hash values. Hash function 245 may be, for example, the "MurmurHash" function.) The bottom level of hash tree 140 may include a set of hash values, each of which corresponds to a respective attribute 220 defined in database schema 115.

After generating the bottom level of hash tree 140, snapshot generation engine 240 may group each hash value of the bottom level such that a given group includes hash values that are associated with a respective database table 210. In some embodiments, snapshot generation engine 240 provides, for each group, the hash values of that group to hash function 245 as input to derive a hash value. The next level of hash tree 140 may include a set of hash values, each of which corresponds to a respective database table 210. In various embodiments, snapshot generation engine 240 provides the hash values of that next level to hash function 245 as input to derive root hash value 145. After generating snapshot 130, snapshot generation engine 240 may incorporate hash tree 140 into snapshot 130. As an example, hash tree 140 may be stored in a "fingerprint" field of snapshot 130. In some embodiments, only root hash value 145 may be included with snapshot 130.

Figure 3A:
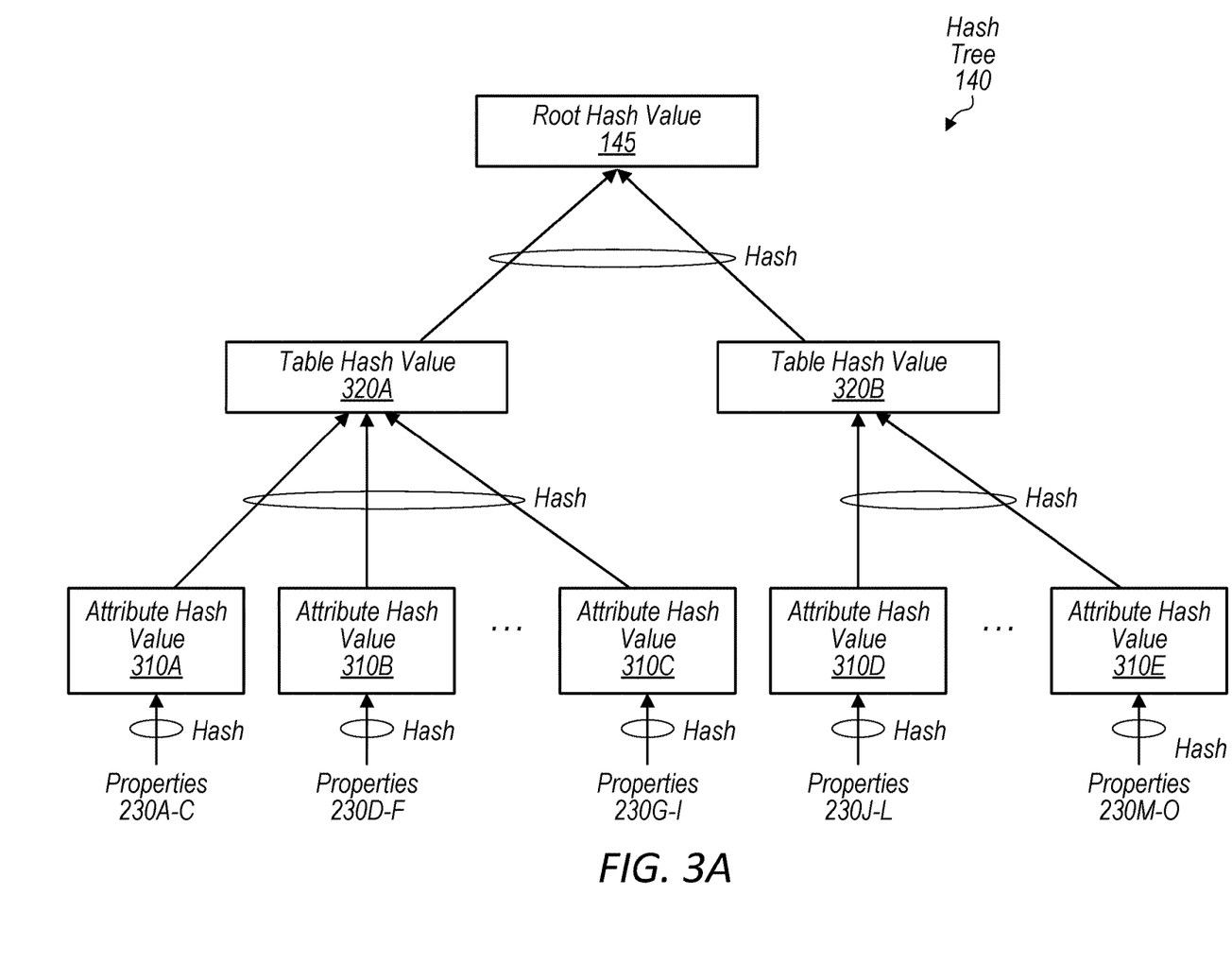
FIG. 3A is a block diagram illustrating example elements of a hash tree having a root hash value usable to identify a database schema, according to some embodiments.

Turning now to FIG. 3A, a block diagram of an example hash tree 140 is shown. In the illustrated embodiment, hash tree 140 includes a first level having attribute hash values 310A-E, a second level having database table hash values 320A and 320B, and a third level having root hash value 145. As further illustrated, attribute hash values 310A-E are based on properties 230A-O. In some embodiments, hash tree 140 may be implemented differently than shown. As an example, hash tree 140 may not include the second level of hash values.

An attribute hash value 310, in various embodiments, is a hash value that corresponds to an attribute 220. An attribute hash value 310 may be generated by applying hash function 245 (or a set of hash functions 245) to one or more properties 230 that are associated with the attribute hash value's corresponding attribute 220. As shown, attribute hash value 310A is generated by hashing together properties 230A-C. In various embodiments, particular properties 230 are not provided as input into hash function 245. For example, human readable characteristics, such as attribute names, or the order of object creation may not be an input into hash function 245. Consequently, in this manner, hash tree 140 may be insensitive to human readable characteristics.

Table hash value 320, in various embodiments, is a hash value that corresponds to a database table 210. A table hash value 320 may be generated by applying hash function 245 (or a set of hash functions 245) to the attribute hash values 310A that correspond to table hash value's associated database table 210. As shown, table hash value 320A is generated by hashing together attributes hash values 310A-C. Root hash value 145, in various embodiments, is a hash value that uniquely corresponds to a database schema 115. Root hash value 145 may be generated by applying hash function 245 (or a set of hash functions 245) to all table hash values 320 of the appropriate hash tree 140. As illustrated, root hash value 145 is generated by hashing together table hash values 320A and 320B.

Since the top and middle levels of hash tree 140 incorporate the hash values of their children as parameters, database system 120 may identify not only if a mismatch occurred but where it occurred. For example, if property 230A was modified, then this would result in attribute hash value 310A being different and thus table hash value 320A would be different and thus root hash value 145 would be different. Accordingly, database system 120 may identify that a particular branch includes hash values that are different than the corresponding branch of another hash tree 140. As such, database system 120 may traverse to the end of that particular branch to identify which attribute 220 is different. In some cases, database system 120 may identify a branch that does not exist in the other database schema 115.

Figure 3B:
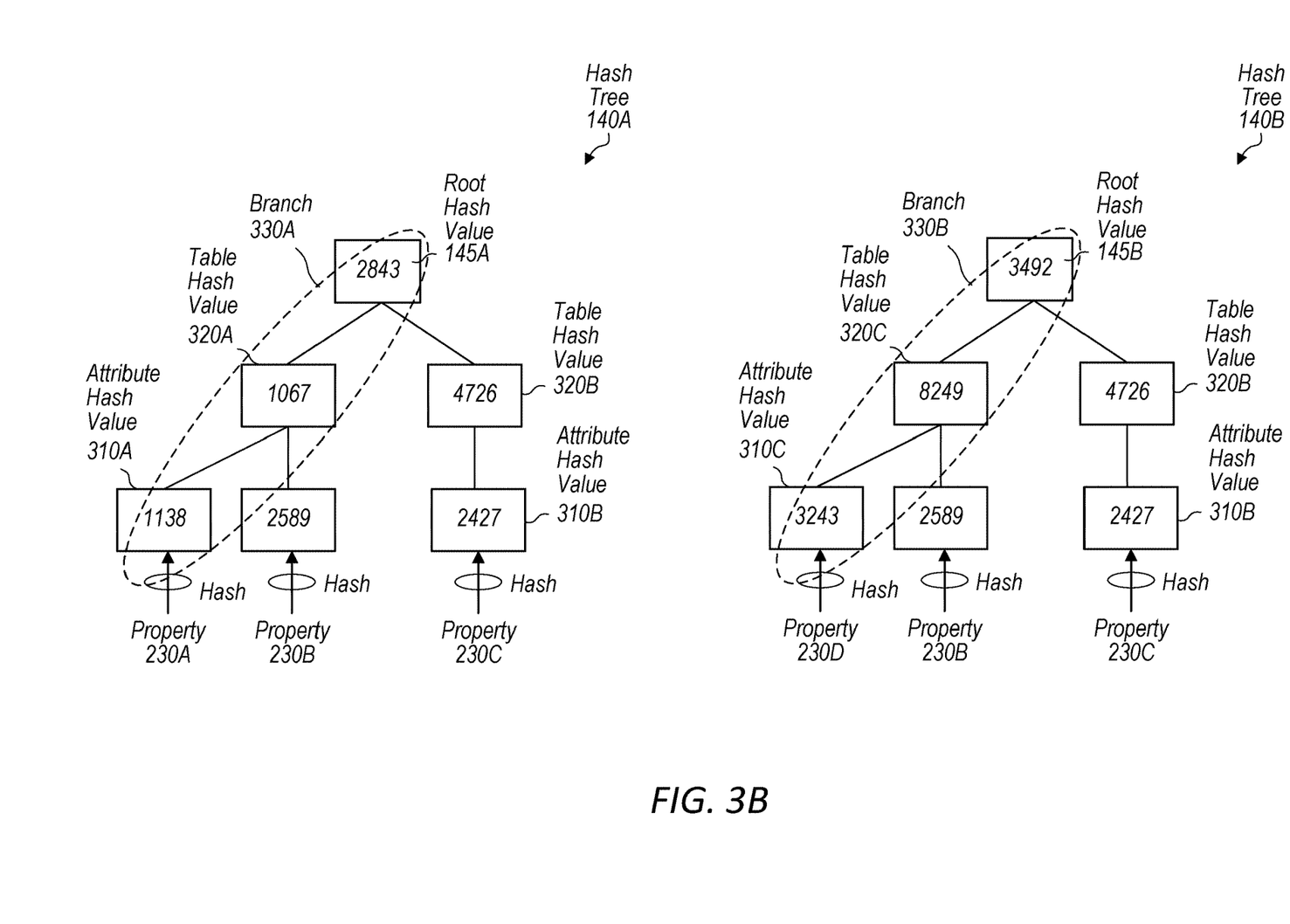
FIG. 3B is a block diagram illustrating example elements of two different hash trees, according to some embodiments.

Turning now to FIG. 3B, a block diagram of two example hash trees 140 is shown. In the illustrated embodiment, hash tree 140A is different from hash tree 140B. While hash tree 140A and 140B both include the same attribute hash value 310B and table hash value 320B as shown, hash tree 140A includes an attribute hash value 310A, a table hash value 320A, and a root hash value 145A that are different from hash tree 140B, which includes an attribute hash value 310C, a table hash value 320C, and a root hash value 145B. Database system 120 may initially compare root hash value 145A of hash tree 140A to root hash value 145B of hash tree 140B. Since root hash value 145A's value of 2843 is different than root hash value 145B's value of 3492, then the database schema 115 of hash tree 140A is different than the database schema 115 of hash tree 140B. Database system 120 may determine how the two database schemas 115 are different by analyzing the corresponding branches (e.g., branch 330A with branch 330B) of both hash trees 140. As shown, attribute hash value 310A is generated by hashing property 230A while the corresponding attribute hash value 310C is generated by hashing property 230D. This results in table hash value 320A being different than table hash value 320C and root hash value 145A being different than root hash value 145B. As a result, branch 330A is different than branch 330B as shown. After database system 120 has determined that branch 330A is different than branch 330B, database system 120 may further determine what caused the difference. As such, database system 120 may identify that property 230A is different than property 230C. Database system 120 may provide this information to a user of system 100 for assessment.

Figure 4:
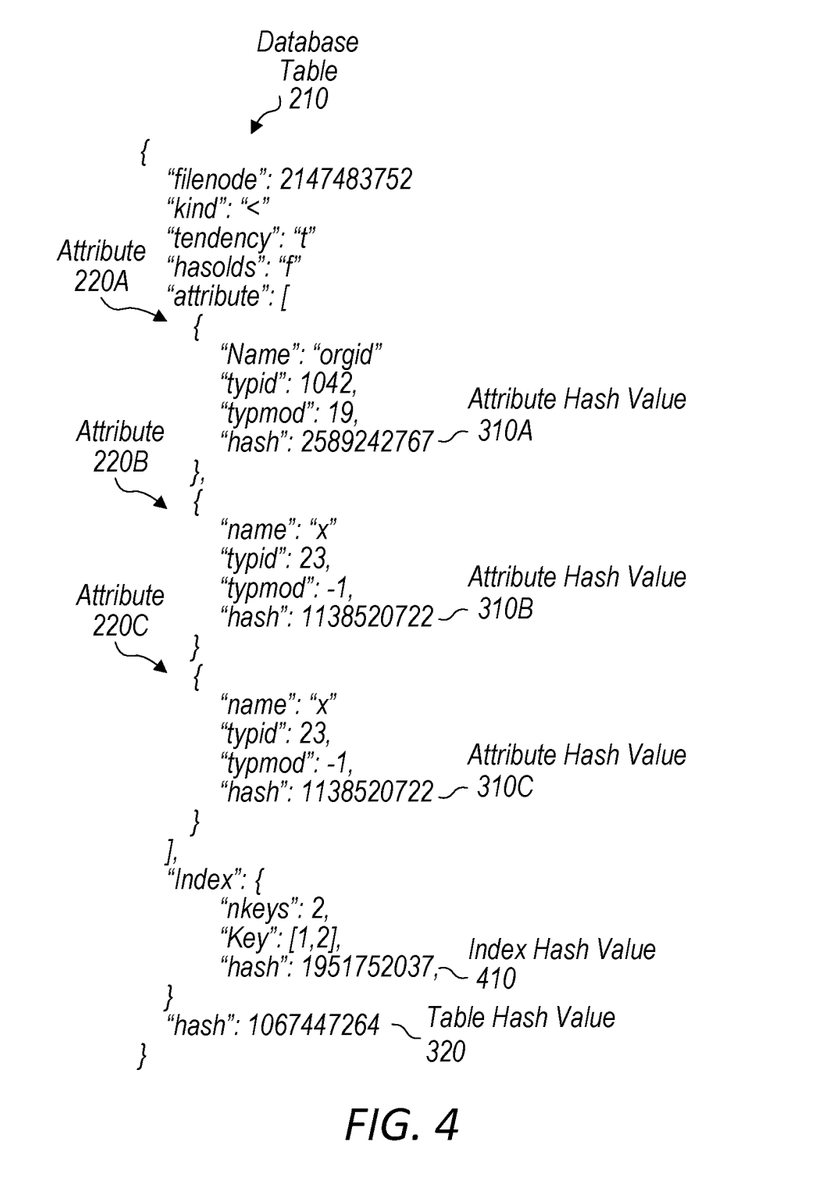
FIG. 4 is block diagram illustrating example elements that include example data that can be hashed to create a hash tree having a root hash value, according to some embodiments.

Turning now to FIG. 4, a block diagram of an example of a part of a hash tree 140 stored in JavaScript Object Notation (JSON) format is shown. JSON format is used as an example; hash tree 140 may be stored in other hierarchical formats. The part of hash tree 140 depicted corresponds to a database table 210. As shown, the database table 210 includes three attributes 220A-C. Accordingly, three attribute hash values 310A-C are generated based on the properties 230 of those three attributes 220. A database table 210 may be associated with an index. In various embodiments, properties of that index are hashed to form an index hash value 410. The index hash value 410 may be provided as an input with the appropriate attribute hash values 310 into hash function 245 to generate a table hash value 320. As an example, index hash value 410 and attribute hash values 310A-C may be hashed together to generate table hash value 320.

Figure 5:
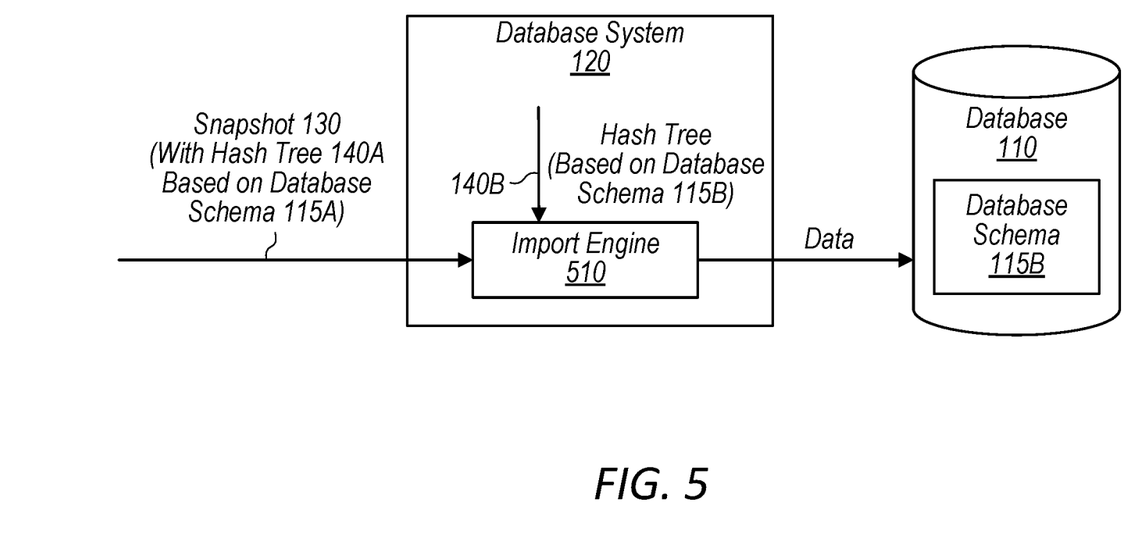
FIG. 5 is a block diagram illustrating example elements of an import engine usable to create a state associated with a snapshot, according to some embodiments.

Turning now to FIG. 5, a block diagram of an example database system 120 capable of using a snapshot 130 to store data in database 110 is shown. In the illustrated embodiment, database system 120 includes an import engine 510. In some embodiments, database system 120 may be implemented differently than shown. For example, instead of receiving a hash tree 140B, import engine 510 may be capable of generating hash tree 140B.

Import engine 510, in various embodiments, is a set of software routines executable to use a received snapshot 130 to store data in database 110. For example, import engine 510 may deserialize snapshot 130 and use it to form a tenant—e.g., by recreating the tenant's data within database 110. As illustrated, import engine 510 can receive a snapshot 130 having a hash tree 140A that was created based on database schema 115A. The snapshot 130 may be received as part of an import request to import data into database 110. In response to the request, import engine 510 may cause a hash tree 140B to be created that is based on database schema 115B—e.g., by communicating with snapshot generation engine 240.

After hash tree 140B has been created, import engine 510 may compare the root hash value 145 of hash tree 140A to the root hash value 145 of hash tree 140B. If the two root hash values 145 match, then import engine 510 may proceed to import the data identified by snapshot 130 into database 110. If the two root hash values 145 do not match, import engine 510 may not import the identified data into database 110. Import engine 510 may return a response that indicates either a success or failure in importing the data identified snapshot 130. In some embodiments, import engine 510 may traverse both hash trees 140A and 140B to identify what hash values are different between the two hash trees. As part of the returned response, import engine 510 may indicate how hash trees 140A and 140B are different—e.g., by identifying which hash values are different.

Figure 6:
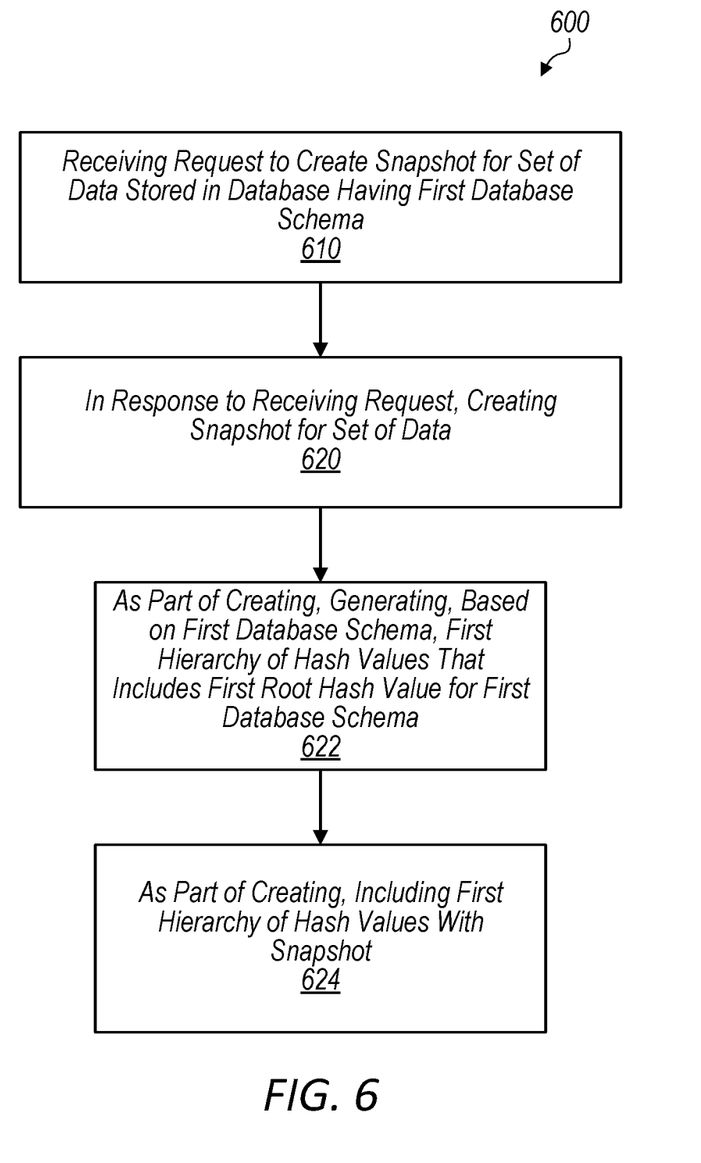
FIGS. 6 and 7 are flow diagrams illustrating example methods that relate to creating a snapshot that includes a root hash value, according to some embodiments.

Turning now to FIG. 6, a flow diagram of a method 600 is shown. Method 600 is one embodiment of a method performed by a computer system (e.g., database system 120) to create a snapshot (e.g., snapshot 130) that includes a root hash value (e.g., root hash value 145) that identifies a first database schema (e.g., database schema 115) of a database (e.g., database 110). In various cases, method 600 may be performed by executing a set of program instructions stored on a non-transitory computer readable medium. In some embodiments, method 600 includes more or less steps—e.g., method 600 may include a step in which the computer system stores a set of data (captured in the snapshot) under a second database schema in response to determining that the root hash value of the first database schema and the root hash value of the second database schema match.

Method 600 begins in step 610 with the computer system receiving a request (e.g., snapshot request 125) to create a snapshot for a set of data stored in the database having the first database schema. The first database schema may define a plurality of database tables (e.g., database tables 210). A given database table may be associated with a set of attributes (e.g., attributes 220). A given attribute is associated with a set of properties (e.g., properties 230). In step 620, in response to receiving the request, the computer system creates the snapshot for the set of data.

In step 622, as part of creating the snapshot, the computer system generates, based on the first database schema, a first hierarchy of hash values (e.g., hash tree 140) that includes a first root hash value for the first database schema. As part of generating the first hierarchy of hash values, the computer system may apply, for the given attribute, a hash function (e.g., hash function 245) to one or more of the set of properties of the given attribute to derive a hash value (e.g., attribute hash value 310) that forms a part of a first level of hash values. A particular set of hash values included in the first level of hash values may correspond to a particular database table of the plurality of database tables. As part of generating the first hierarchy of hash values, the computer system may apply a hash function to the particular set of hash values to derive a hash value (e.g., database table hash value 320) that forms a part of a second level of hash values. The computer system may apply a hash function to hash values included in the second level of hash values to derive the first root hash value.

In step 624, as part of creating the snapshot, the computer system includes the first hierarchy of hash values with the snapshot. The first hierarchy of hash values may be usable to determine whether the first database schema is different from a second database schema. The snapshot may be usable to import the set of data into a database associated with a sandbox environment.

In some embodiments, the computer system receives a second request to import, based on the snapshot, the set of data into a database having the second database schema. In response to the second request, the computer system may generate a second hierarchy of hash values that includes a second root hash value for the second database schema. The computer system may compare the first root hash value with the second root hash value to determine whether the first database schema is different from the second database schema. In response to determining that the first database schema is different from the second database schema, the computer system may prevent the set of data from being imported into the database having the second database schema. The computer system may return a response, to the second request, that identifies at least one difference between the first and second database schemas.

In some cases, the computer system may identify at least one different hash value between a first level of hash values of the first hierarchy and a first level of hash values of the second hierarchy. The at least one different hash value may indicate the at least one difference between the first and second database schemas. The second database schema may define an attribute for a particular database table whiles the first database schema does not define the attribute for the particular database table.

Figure 7:
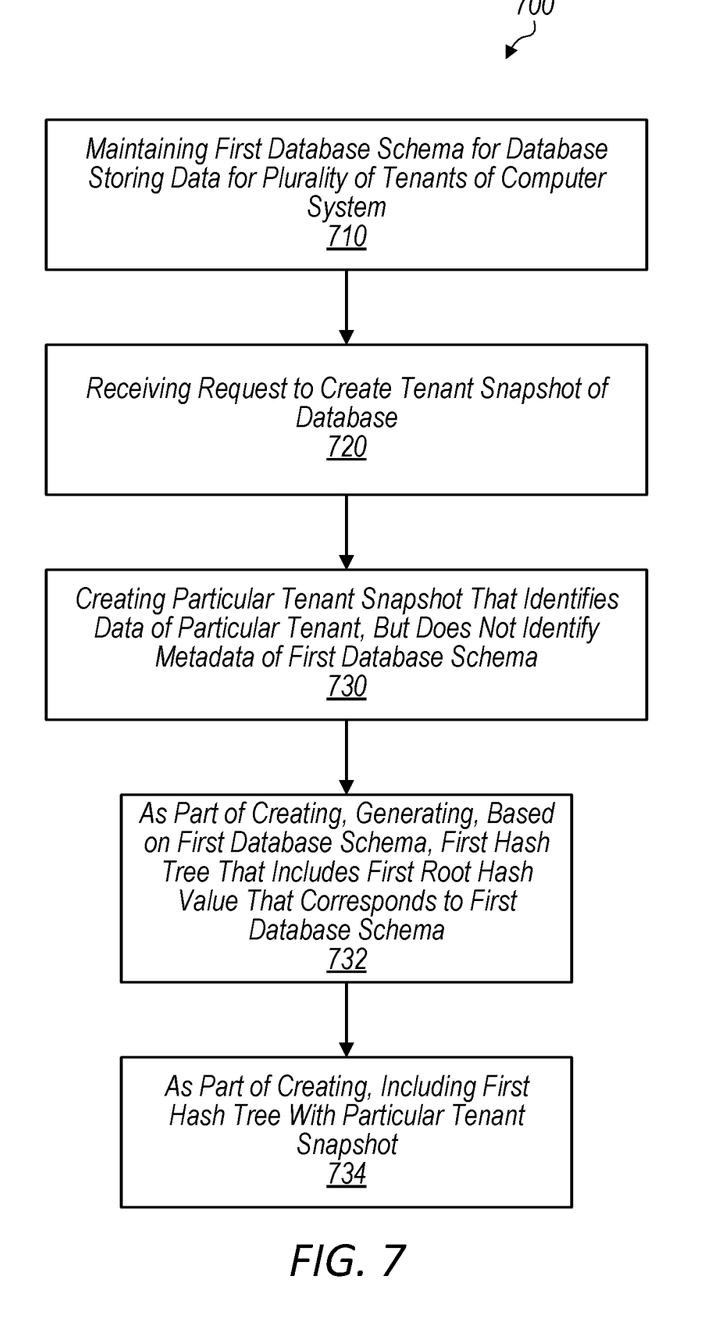

Turning now to FIG. 7, a flow diagram of a method 700 is shown. Method 700 is one embodiment of a method performed by a computer system (e.g., database system 120) to create a snapshot (e.g., snapshot 130) having a root hash value (e.g., root hash value 145) that identifies a database schema (e.g., database schema 115) of a database (e.g., database 110). In various cases, method 700 may be performed by executing a set of program instructions stored on a non-transitory computer readable medium. In some embodiments, method 700 includes more or less steps—e.g., method 700 may include a step in which the computer system sends a particular tenant snapshot to another computer system that manages a second database having a second database schema. The other computer system may be capable of generating a second hash tree based on the second database schema and comparing a second root hash value of the second hash tree to a first root hash value included with the particular tenant snapshot to determine whether the first database schema is different from the second database schema.

Method 700 begins in step 710 with the computer system maintaining a first database schema for a database storing data for a plurality of tenants of the computer system. The first database schema may include metadata that defines a plurality of database tables (e.g., database tables 210). As part of defining the plurality of database tables, the metadata may define a set of attributes (e.g., attributes 220) and a set of properties (e.g., properties 230) for each of those attributes.

In step 720, the computer system receives a request (e.g., snapshot request 125) to create a tenant snapshot (e.g., snapshot 130) of data stored in the database. The tenant snapshot may be associated with particular one of the plurality of tenants of the computer system.

In step 730, the computer system creates a particular tenant snapshot that identifies data of the particular tenant, but does not identify the metadata of the first database schema. In some cases, a particular database table of the plurality of database tables may store a portion of the data of the particular tenant and data of a second particular tenant of the plurality of tenants. As such, the particular tenant snapshot may identify the portion of the data of the particular tenant, but does not identify the data of the second particular tenant stored in the particular database table.

In step 732, as part of creating the particular tenant snapshot, the computer system generates, based on the first database schema, a first hash tree (e.g., hash tree 140) that includes a first root hash value that corresponds to the first database schema.

In step 734, as part of creating the particular tenant snapshot, the computer system includes the first hash tree with the particular tenant snapshot. The first root hash value may be usable to determine whether the first database schema is different from a second database schema.

In various embodiments, the computer system may receive a request to have a second database (which may be the database mentioned in step 710) store the data of the particular tenant that is identified by the particular tenant snapshot. The second database may store data under a third database schema. Accordingly, the computer system may determine whether the first database schema is different from the third database schema. As part of the determining, the computers system may generate, based on the third database schema, a second hash tree that includes a second root hash value that corresponds to the third database schema. The computer system may compare the second root hash value to the first root hash value. In response to determining that the first and third database schemas are different, the computer system may prevent the data of the particular tenant from being stored at the second database. In some embodiments, the computers system may traverse one or more branches of the first hash tree and one or more corresponding branches of the second hash tree to identify a set of differences in hash values between the first and second hash trees.

Exemplary Computer System

Figure 8:
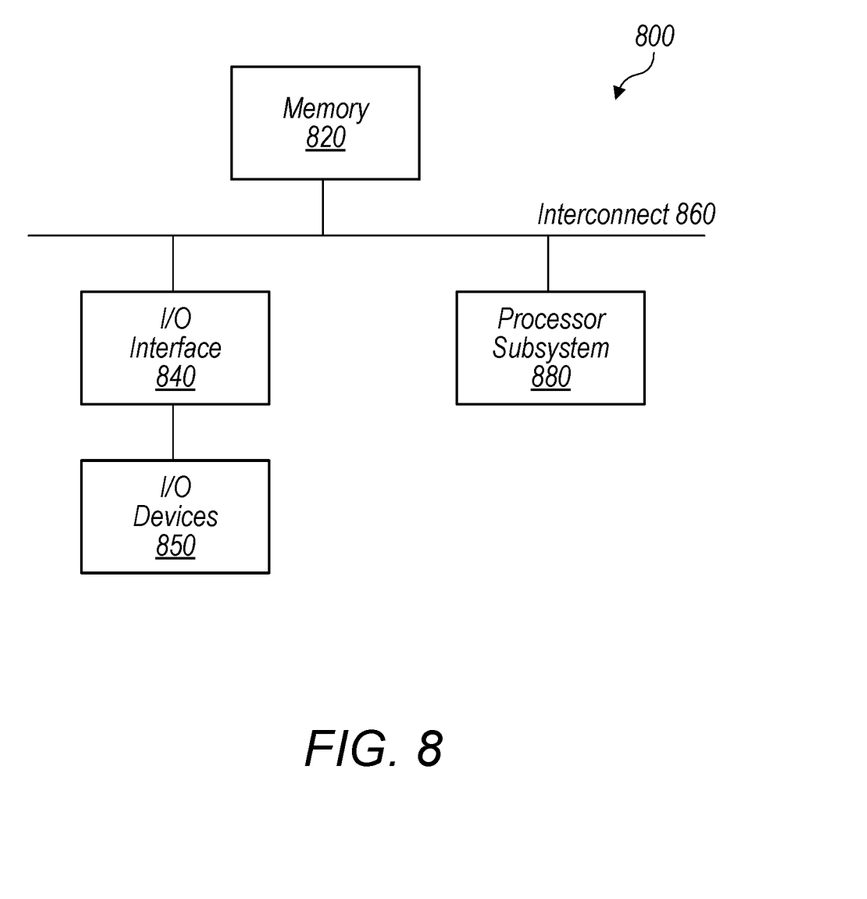
FIG. 8 is a block diagram illustrating an example computer system, according to some embodiments.

Turning now to FIG. 8, a block diagram of an exemplary computer system 800, which may implement system 100, database 110, and/or database system 120, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement snapshot generation engine 240, hash function 245, and import engine 510 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a computer system, a request to create a snapshot for a set of data stored in a database having a first database schema that includes metadata defining a set of database tables used for storing the set of data;
   in response to receiving the request, the computer system creating the snapshot for the set of data, wherein the creating includes:
      generating the snapshot for the set of data, wherein the snapshot does not specify the metadata included in the first database schema;
      generating, based on the metadata of the first database schema, a first hierarchy of hash values that includes a first root hash value for the first database schema, wherein the first hierarchy of hash values includes a first level of hash values derived from properties of attributes of the set of database tables; and
      including the first hierarchy of hash values with the snapshot, wherein the first hierarchy of hash values enables a system to determine whether the set of data of the snapshot can be imported into another set of database tables defined by a second database schema.

2. The method of claim 1, wherein a given database table of the set of database tables is associated with a set of attributes, and wherein a given attribute is associated with a set of properties.

3. The method of claim 2, wherein generating the first hierarchy of hash values includes:
   applying, for the given attribute, a hash function to one or more of the set of properties of the given attribute to derive a hash value that forms a part of the first level of hash values.

4. The method of claim 3, wherein a particular set of hash values included in the first level of hash values corresponds to a particular database table of the set of database tables, wherein generating the first hierarchy of hash values includes:
   applying a hash function to the particular set of hash values to derive a hash value that forms a part of a second level of hash values.

5. The method of claim 4, wherein generating the first hierarchy of hash values includes:
   applying a hash function to hash values included in the second level of hash values to derive the first root hash value.

6. The method of claim 1, further comprising:
   receiving, by the computer system, a second request to import, based on the snapshot, the set of data into a database having the second database schema;
   in response to the second request, the computer system generating a second hierarchy of hash values that includes a second root hash value for the second database schema; and
   comparing, by the computer system, the first root hash value with the second root hash value to determine whether the first database schema is different from the second database schema.

7. The method of claim 6, further comprising:
   in response to determining that the first database schema is different from the second database schema, the computer system preventing the set of data from being imported into the database having the second database schema; and
   returning, by the computer system, a response, to the second request, that identifies at least one difference between the first and second database schemas.

8. The method of claim 7, wherein returning the response to the second request includes:

identifying, by the computer system, at least one different hash value between a first level of hash values of the first hierarchy and a first level of hash values of the second hierarchy, wherein the first level of hash values of the first hierarchy includes hash values of properties that are associated with attributes of the set of database tables defined in the first database schema, and wherein the at least one different hash value indicates the at least one difference between the first and second database schemas.

9. The method of claim 7, wherein the second database schema defines an attribute for a particular database table and the first database schema does not define the attribute for the particular database table.

10. The method of claim 1, wherein the snapshot is usable to import the set of data into a database associated with a sandbox environment.

11. A non-transitory computer readable medium having program instructions stored thereon that are capable of causing a computer system to perform operations comprising:

receiving a request to create a snapshot for a set of data stored in a database having a first database schema that includes metadata defining a set of database tables used for storing the set of data;

in response to receiving the request, creating the snapshot for the set of data, wherein the creating includes:

generating the snapshot for the set of data, wherein the snapshot does not specify the metadata included in the first database schema;

generating, based on the metadata of the first database schema, a hierarchy of hash values that includes a root hash value for the first database schema, wherein the hierarchy of hash values includes a first level of hash values derived from properties of attributes of the set of database tables; and including the hierarchy of hash values with the snapshot, wherein the hierarchy of hash values enables a system to determine whether the set of data of the snapshot can be imported into another set of database tables defined by a second database schema.

12. The non-transitory computer readable medium of claim 11, wherein a given database table of the set of database tables includes a set of attributes, wherein a given attribute is associated with a set of properties, wherein generating the hierarchy of hash values includes:

for each attribute in the set of attributes of a database table included in the set of database tables, applying a hash function to the set of properties associated with that attribute to produce a hash value that forms a part of the first level of hash values of the hierarchy.

13. The non-transitory computer readable medium of claim 12, wherein hash values of the first level of hash values correspond to two or more sets of hash values, and wherein generating the hierarchy of hash values includes:

for each set of the two or more sets of hash values, applying a hash function to that set of hash values to produce a hash value that forms a part of a second level of hash values of the hierarchy.

14. The non-transitory computer readable medium of claim 13, wherein generating the hierarchy of hash values includes:

applying a hash function to the second level of hash values of the hierarchy to produce the root hash value.

15. The non-transitory computer readable medium of claim 11, wherein the operations further comprise:

receiving a request to store the set of data under the second database schema;

determining whether the first and second database schemas are different by comparing the root hash value of the first database schema and a root hash value of the second database schema; and in response to determining that the root hash value of the first database schema and the root hash value of the second database schema match, storing the set of data under the second database schema.

16. A system, comprising:

at least one processor; and a memory having program instructions stored thereon that are executable by the at least one processor to perform operations comprising:

maintaining a first database schema for a database storing data for a plurality of tenants of the system, wherein the first database schema includes metadata that defines a plurality of database tables for storing a set of data;

receiving a request to create a tenant snapshot for the set of data, wherein the tenant snapshot is associated with particular one of the plurality of tenants; and creating a particular tenant snapshot that identifies the set of data, but does not identify the metadata of the first database schema, wherein the creating includes:

generating, based on the metadata of the first database schema, a first hash tree that includes a first root hash value that corresponds to the first database schema, wherein the first hash tree includes a first level of hash values derived from properties of attributes of the plurality of database tables; and including the first hash tree with the particular tenant snapshot, wherein the first root hash value enables a system to determine whether the set of data of the particular tenant snapshot can be imported into another plurality of database tables defined by another database schema.

17. The system of claim 16, further comprising:

receiving a request to have a second database store the set of data identified by the particular tenant snapshot, wherein the second database stores data under a second database schema; and determining whether the first database schema is different from the second database schema, including by:

generating, based on the second database schema, a second hash tree that includes a second root hash value that corresponds to the second database schema; and comparing the second root hash value to the first root hash value; and in response to determining that the first and second database schemas are different, preventing the data of the particular tenant from being stored at the second database.

18. The system of claim 17, further comprising:

traversing one or more branches of the first hash tree and one or more corresponding branches of the second hash tree to identify a set of differences in hash values between the first and second hash trees, wherein the set of differences in hash values is usable to identify differences in the first and second database schemas.

19. The system of claim 16, further comprising:

sending the particular tenant snapshot to a second computer system that manages a second database that includes the other database schema, wherein the second computer system is capable of generating a second hash tree using the other database schema and comparing a second root hash value of the second hash tree to the first root hash value to determine whether the set of data can be imported under the other database schema.

20. The system of claim 16, wherein a particular database table of the plurality of database tables stores a portion of data of the particular tenant and data of a second particular tenant of the plurality of tenants, and wherein the particular tenant snapshot identifies the portion of the data of the particular tenant, but does not identify the data of the second particular tenant that is stored in the particular database table.

* * * * *